United States Patent
Malin et al.

(10) Patent No.: US 7,360,114 B2
(45) Date of Patent: Apr. 15, 2008

(54) LOGGING OF EXCEPTION DATA

(75) Inventors: Francis Gerard Malin, Rochester, MN (US); Charles James Redlin, Rochester, MN (US); Hany A. Salem, Pflugerville, TX (US); James W. Stopyro, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 542 days.

(21) Appl. No.: 10/463,283

(22) Filed: Jun. 17, 2003

(65) Prior Publication Data

US 2004/0260474 A1 Dec. 23, 2004

(51) Int. Cl.
G06F 11/00 (2006.01)

(52) U.S. Cl. .................................................. 714/20
(58) Field of Classification Search .............. 714/20, 714/723
See application file for complete search history.

(56) References Cited

U.S. PATENT DOCUMENTS

| | | | | |
|---|---|---|---|---|
| 4,922,491 A | * | 5/1990 | Coale | 714/26 |
| 5,155,731 A | * | 10/1992 | Yamaguchi | 714/45 |
| 5,491,808 A | * | 2/1996 | Geist, Jr. | 711/100 |
| 5,901,308 A | * | 5/1999 | Cohn et al. | 712/244 |
| 6,119,246 A | * | 9/2000 | McLaughlin et al. | 714/27 |
| 6,240,428 B1 | * | 5/2001 | Yeung et al. | 707/206 |
| 6,253,243 B1 | * | 6/2001 | Spencer | 709/224 |
| 6,493,656 B1 | * | 12/2002 | Houston et al. | 702/187 |
| 6,567,796 B1 | * | 5/2003 | Yost et al. | 707/2 |
| 6,598,179 B1 | * | 7/2003 | Chirashnya et al. | 714/37 |
| 6,647,517 B1 | * | 11/2003 | Dickey et al. | 714/48 |
| 6,742,145 B2 | * | 5/2004 | Bailey et al. | 714/42 |
| 6,792,564 B2 | * | 9/2004 | Ahrens et al. | 714/45 |
| 6,851,074 B2 | * | 2/2005 | Miloiicic et al. | 714/20 |
| 6,925,476 B1 | * | 8/2005 | Multer et al. | 707/200 |
| 6,963,997 B2 | * | 11/2005 | Maly et al. | 714/20 |
| 7,003,694 B1 | * | 2/2006 | Anderson et al. | 714/16 |
| 2002/0001307 A1 | * | 1/2002 | Nguyen et al. | 370/386 |
| 2003/0191984 A1 | * | 10/2003 | Flaherty et al. | 714/20 |
| 2004/0128658 A1 | * | 7/2004 | Lueh et al. | 717/151 |
| 2005/0229042 A1 | * | 10/2005 | Crowell et al. | 714/36 |

\* cited by examiner

*Primary Examiner*—Scott Baderman
*Assistant Examiner*—Elmira Mehrmanesh
(74) *Attorney, Agent, or Firm*—Owen J. Gamon

(57) ABSTRACT

A method, apparatus, system, and signal-bearing medium that in an embodiment determine whether to log an exception based on whether the exception has already occurred. In an embodiment, exceptions that repeatedly occur at the same source and location within the source are logged on the first occurrence, and not logged thereafter. In this way, data can be saved about the exception, yet system resources are not consumed by repeated logging.

2 Claims, 4 Drawing Sheets

LOGGING OF EXCEPTION DATA

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

FIELD

This invention generally relates to computer programming and more specifically relates to logging information related to problem determination for a computer program.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated and complex computer software has evolved to take advantage of the higher performance of the hardware, resulting in computer systems today that are much more powerful than just a few years ago.

As the sophistication and complexity of computer software increase, the more difficulty the software developer experiences in determining the source of exceptions, problems, errors, bugs, or faults in the computer program. Historically, problem determination for procedural languages has been handled by establishing a set of return codes and unique messages. But, today's environment of exception-based object oriented languages and framework-based programs has caused problem determination to become more difficult. Also, adding to the complexity, is the need for always-available web-based applications, which cannot afford to be unavailable while the developer analyzes a problem.

There have been a number of basic approaches to problem determination for web-based applications. One approach is for the customer to recreate the problem in a small test program, which the developer can use to analyze the problem in a laboratory environment. This approach is burdensome for the customer.

In another approach, the customer turns on a trace function in the program to capture more data about the program's state, so that when the failure occurs again, the trace function saves trace data, which the developer can use in problem determination. Unfortunately, this approach has a number of undesirable side effects: first, the customer must recreate the problem; second, the performance of the system may degrade beyond a acceptable point because of the overhead of the trace function; and finally, the performance degradation may change the timing of events within the computer system, which makes recreating timing-related problems more difficult.

Yet another approach is a logging function, which writes state information to a log when an unexpected event occurs in a program. If the customer reports a problem, the developer can examine the logs for hints in diagnosing the problem. One of the undesirable effects of logging is that the logging function uses computer system resources to capture the logged data, and the logged data can quickly exhaust the available resources. Further, in some instances, programs may function correctly, yet they still consume valuable and scarce log space with reoccurring conditions. Finally, the program experiencing the unexpected event may be unable to determine the difference between good and bad exception conditions, so the program does not know when logging would be helpful.

A specific example of a program's inability to distinguish between good and bad exceptions is demonstrated by the following simple example. If a banking application receives an "account not found" exception from a program, information about the request needs to be logged. If requests for non-existent accounts persist, the bank will want to investigate to determine the source of this suspicious activity. In contrast, if an online auction application receives an "account not found" exception from a program, the application may simply programmatically recover by creating the account, perhaps with a user confirmation, as a convenience for the user who wants to bid on an auction item.

The process of determining if exceptions or events should or should not be logged is quite problematic for the developer of the program because the developer may have limited knowledge of the application that will utilize the function in the program that experiences the exception or event. Using the above example, the developer of the accounting program does not necessarily know whether a banking application or an online-auction application will be using the accounting program, and they have quite different exception handling requirements.

Since the developer of the program does not know what application might use the program, and what needs the application might have for handling exceptions, typically the program that originates the exception also routinely logs information about the exception as a matter of course to error on the side of safety, which can create a large volume of log information, which can take the developer much time to later analyze. Yet, the application that invokes the program may understand the exception and programmatically recover from the exception, which makes the logged information meaningless to any future exceptions. Further, the logged information consumes valuable and scarce system resources and may quickly wrap the available log memory, which may overwrite previous logged data, which might have been valuable.

Without a better way to manage exceptions, logged information in response to an exception will continue to be of marginal use and will also continue to consume valuable and scarce system resources, which increases the cost to the customer. Although the aforementioned problems have been described in the context of web-based applications and object oriented programming, they may occur in any environment.

SUMMARY

A method, apparatus, system, and signal-bearing medium are provided that in an embodiment determine whether to log an exception based on whether the exception has already occurred. In an embodiment, exceptions that repeatedly occur at the same source and location within the source are logged on the first occurrence, and not logged thereafter. In this way, data can be saved about the exception, yet system resources are not consumed by repeated logging.

DETAILED DESCRIPTION

An embodiment of the invention takes advantage of the following theory: if the exception is an error in the program the first time the execution point is encountered, the exception will also likely be an error at that execution point every time thereafter. Thus, the data logged the first time is probably relevant to all future exceptions, so logging the exception data more than once is probably not necessary.

Likewise, if the exception is not an error at the execution point the first time the exception is encountered, it will also likely not be an error at that execution point every time thereafter, so logging exception data more than once is probably not necessary. For example, if an application encounters a FileNotFound Exception on an open operation of a file, the application can programmatically recover by creating the file, so there is little to gain by logging the exception data every time the exception is encountered.

In some instances, exceptions that have originated from the same location and previously programmatically recovered may not be handled, due to a different caller of the program that encountered the exception. At the time the exception occurs, an embodiment of the invention considers the exception to be a new failure, so exception data is logged.

Figure 1:
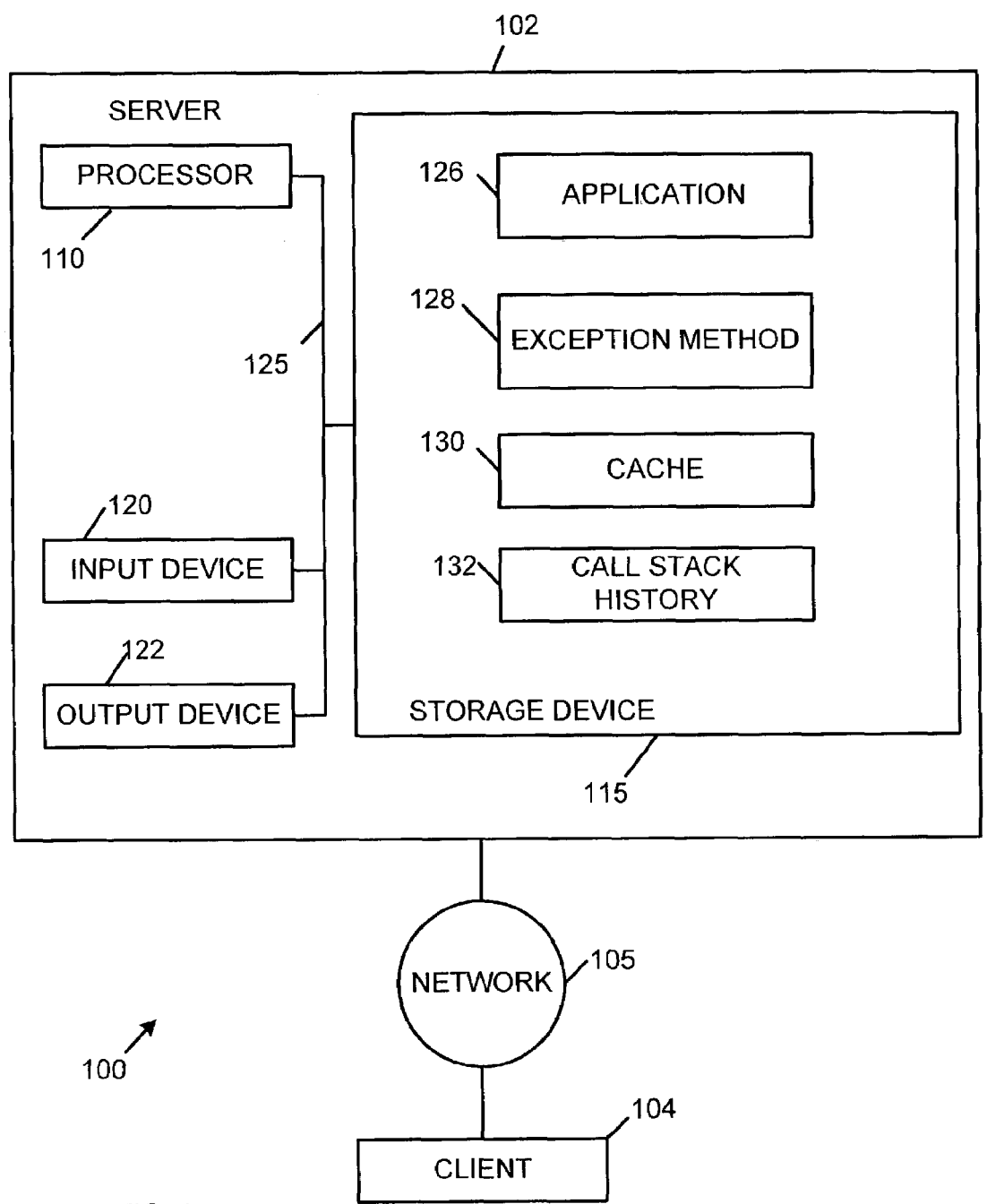
FIG. 1 depicts a block diagram of an example system for implementing an embodiment of the invention.

FIG. 1 depicts a block diagram of an example system 100 for implementing an embodiment of the invention. The system 100 includes a server 102 connected to a client 104 via a network 105. Although only one server 102, one client 104, and one network 105 are shown, in other embodiments any number or combination of them may be present. In another embodiment, the client 104 and the network 105 are not present.

The server 102 includes a processor 110, a storage device 115, an input device 120, and an output device 122, all connected directly or indirectly via a bus 125. The processor 110 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 110 executes instructions and includes that portion of the server 102 that controls the operation of the entire server. Although not depicted in FIG. 1, the processor 110 typically includes a control unit that organizes data and program storage in memory and transfers data and other information between the various parts of the server 102. The processor 110 reads and/or writes code and data to/from the storage device 115, the network 105, the input device 120, and/or the output device 122.

Although the server 102 is shown to contain only a single processor 110 and a single bus 125, embodiments of the present invention apply equally to servers that may have multiple processors and multiple buses with some or all performing different functions in different ways.

The storage device 115 represents one or more mechanisms for storing data. For example, the storage device 115 may include read only memory (ROM), random access memory (RAM), magnetic disk storage media, optical storage media, flash memory devices, and/or other machine-readable media. In other embodiments, any appropriate type of storage device may be used. Although only one storage device 115 is shown, multiple storage devices and multiple types of storage devices may be present. Further, although the server 102 is drawn to contain the storage device 115, it may be distributed across other servers, such as devices connected to the network 105.

The storage device 115 includes an application 126, an exception method 128, a cache 130, and a call stack history 132, all of which may in various embodiments have any number of instances.

The application 126 includes instructions capable of executing on the processor 110 or statements capable of being interpreted by instructions executing on the processor 110. The application 126 uses the services of the exception method 128 in response to requests from the client 104. In another embodiment, the application 126 uses the services of the exception method 128 in response to requests from a user or another program. An example of a portion of the application 126 is further described below with reference to FIG. 3.

The exception method 128 logs information in the cache 130. In an embodiment, the exception method 128 includes instructions capable of executing on the processor 110 or statements capable of being interpreted by instructions executing on the processor 110 to carry out the functions as further described below with reference to FIG. 4 using the cache 130 and the call stack history 132. In another embodiment, the exception method 128 may be implemented in hardware via logic gates and/or other appropriate hardware techniques.

The cache 130 contains logged information about exceptions. The cache 130 may be used in determining the source of problems related to the application 126. The structure and organization of the cache 130 is further described below with reference to FIG. 2, and the use of the cache 130 is further described below with reference to FIG. 4.

The call stack history 132 is a repository for the call stack and other data associated with the state of the application 126 when it encounters an exception. Although the cache 130 and the call stack history 132 are illustrated as being in different data structures, in another embodiment the contents of the cache 130 and the call stack history 132 may be included in the same data structure.

Although the application 126, the exception method 128, the cache 130, and the call stack history 132 are all illustrated as being contained within the storage device 115 in the server 102, in other embodiments some or all of them may be on different servers and may be accessed remotely, e.g., via the network 105.

The input device 120 may be a keyboard, mouse or other pointing device, trackball, touchpad, touchscreen, keypad, microphone, voice recognition device, or any other appropriate mechanism for the user to input data to the server 102 and/or to manipulate the user interfaces, if any, of the server 102. Although only one input device 120 is shown, in another embodiment any number, including zero, and type of input devices may be present.

The output device 122 is that part of the server 102 that presents output to the user. The output device 122 may be a cathode-ray tube (CRT) based video display well known in the art of computer hardware. But, in other embodiments the output device 122 may be replaced with a liquid crystal display (LCD) based or gas, plasma-based, flat-panel display. In still other embodiments, any appropriate display device may be used. In other embodiments, a speaker or a printer may be used. In other embodiments any appropriate output device may be used. Although only one output device 122 is shown, in other embodiments, any number of output devices of different types or of the same type may be present. In another embodiment, the output device 122 is not present.

The bus 125 may represent one or more busses, e.g., PCI (Peripheral Component Interconnect), ISA (Industry Standard Architecture), X-Bus, EISA (Extended Industry Standard Architecture), or any other appropriate bus and/or bridge (also called a bus controller).

The server 102 may be implemented using any suitable hardware and/or software, such as a personal computer. Portable computers, laptop or notebook computers, PDAs (Personal Digital Assistants), pocket computers, telephones, pagers, automobiles, teleconferencing systems, appliances, and mainframe computers are examples of other possible configurations of the server 102. The hardware and software depicted in FIG. 1 may vary for specific applications and may include more or fewer elements than those depicted. For example, other peripheral devices such as audio adapters, or chip programming devices, such as EPROM (Erasable Programmable Read-Only Memory) programming devices may be used in addition to or in place of the hardware already depicted.

The network 105 may be any suitable network or combination of networks and may support any appropriate protocol suitable for communication of data and/or code to/from the server 102. In various embodiments, the network 105 may represent a storage device or a combination of storage devices, either connected directly or indirectly to the server 102. In an embodiment, the network 105 may support Infiniband. In another embodiment, the network 105 may support wireless communications. In another embodiment, the network 105 may support hard-wired communications, such as a telephone line or cable. In another embodiment, the network 105 may support the Ethernet IEEE (Institute of Electrical and Electronics Engineers) 802.3x specification. In another embodiment, the network 105 may be the Internet and may support IP (Internet Protocol). In another embodiment, the network 105 may be a local area network (LAN) or a wide area network (WAN). In another embodiment, the network 105 may be a hotspot service provider network. In another embodiment, the network 105 may be an intranet. In another embodiment, the network 105 may be a GPRS (General Packet Radio Service) network. In another embodiment, the network 105 may be any appropriate cellular data network or cell-based radio network technology. In another embodiment, the network 105 may be an IEEE 802.11B wireless network. In still another embodiment, the network 105 may be any suitable network or combination of networks. Although one network 105 is shown, in other embodiments any number of networks (of the same or different types) may be present.

The client 104 may be an electronic device that sends requests to and receives responses from the server 102 via the network 105. In another embodiment, the client 104 is not present.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the server 102, and that, when read and executed by one or more processors in the server 102, cause the server 102 to perform the steps necessary to execute steps or elements embodying the various aspects of an embodiment of the invention.

Moreover, while embodiments of the invention have and hereinafter will be described in the context of fully functioning servers, the various embodiments of the invention are capable of being distributed as a program product in a variety of forms, and the invention applies equally regardless of the particular type of signal-bearing medium used to actually carry out the distribution. The programs defining the functions of this embodiment may be delivered to the server 102 via a variety of signal-bearing media, which include, but are not limited to:

(1) information permanently stored on a non-rewriteable storage medium, e.g., a read-only memory device attached to or within a server, such as a CD-ROM readable by a CD-ROM drive;

(2) alterable information stored on a rewriteable storage medium, e.g., a hard disk drive or diskette; or (3) information conveyed to a server by a communications medium, such as through a computer or a telephone network, e.g., the network 105, including wireless communications.

Such signal-bearing media, when carrying machine-readable instructions that direct the functions of the present invention, represent embodiments of the present invention.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
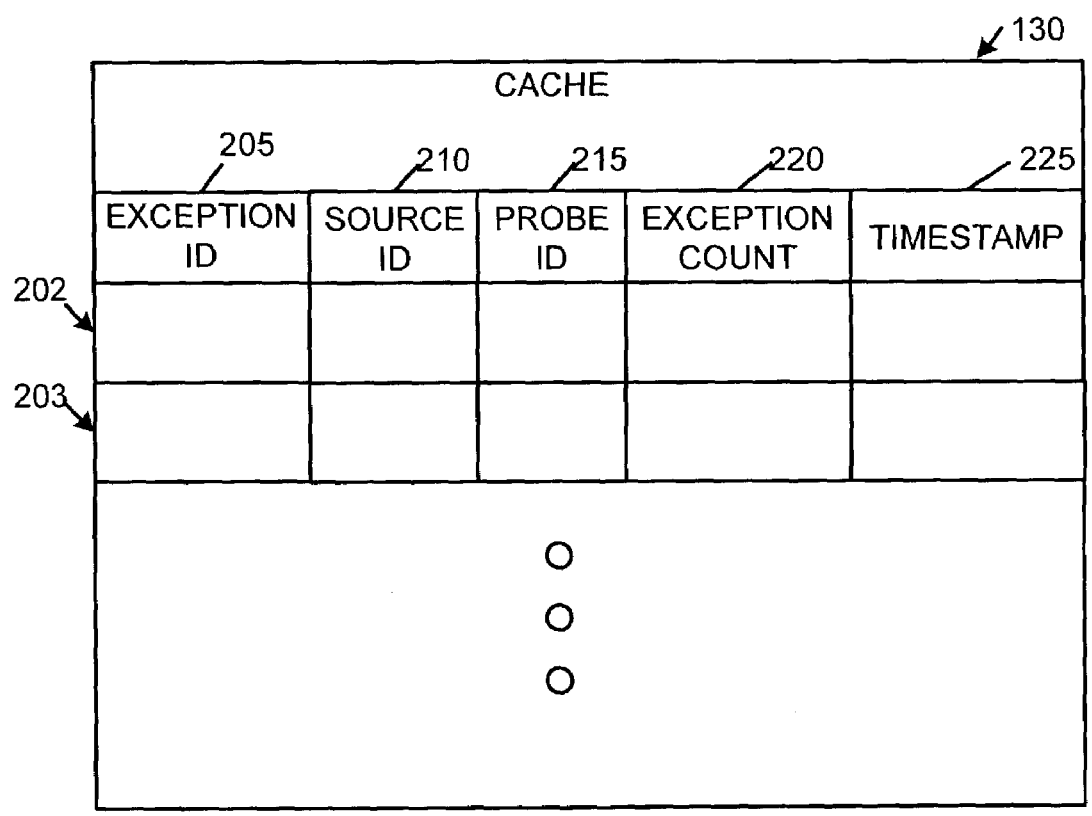
FIG. 2 depicts a block diagram of an example cache data structure, according to an embodiment of the invention.

FIG. 2 depicts a block diagram of an example cache data structure 130, according to an embodiment of the invention. The cache 130 includes log entries 202 and 203, each having an exception identifier 205, a source identifier 210, a probe identifier 215, an exception count 220, and a timestamp 225. Although two log entries 202 and 203 are shown, in other embodiments any number of entries may be present.

The exception identifier 205 identifies the exception. Examples of exceptions are file not found or account number not found. But, in various embodiments the exception may represent any appropriate error, fault, event, or condition whether expected or unexpected.

The source identifier 210 identifies the source of the exception. In various embodiments, the source identifier 210 may identify the application 126 or a method, procedure, module, file, or other source within the application 126 where the exception occurred.

The probe identifier 215 identifies the location within the source identified by the source identifier 210 where the exception occurred. In various embodiments, the probe identifier 215 may represent a line number, instruction number, sequence number, instruction pointer within an address space, or any appropriate type of location identifier.

In an embodiment, the source identifier 210 and/or the probe identifier 215 may be generated by a compiler of the application 126. For example, the VisualAge C++ compiler generates a source and probe identifier using a compiler directive. But, in other embodiments any appropriate compiler or interpreter may be used. In another embodiment, the source identifier 210 and/or the probe identifier 215 may be generated from a runtime method. For example, the print-StackTrace( ) method in Java may be used to determine the point of execution. But, in other embodiments any appropriate runtime method may be used. In another embodiment, the source identifier 210 and/or the probe identifier 215 may be generated by a developer of the application 126.

In an embodiment, the combination of the exception identifier 205, the source identifier 210, and the probe identifier 215 may be unique within the life of one invocation of the application 126, and the combination may be different on a different invocation of the application 126. For example, on different invocations of the same application 126, each invocation may have a different source identifier 210.

In another embodiment, the combination of the exception identifier 205, the source identifier 210, and the probe identifier 215 may be unique across all invocations of the application 126 on the same server 102. For example, if the same application 126 is invoked multiple times, each time the same exception occurs at the same location, the exception identifier 205, the source identifier 210, and the probe identifier 215 will be the same.

The exception count 220 represents a count of the number of times the exception has occurred. The contents of the exception count 220 are generated by the exception method 128, as further described below with reference to FIG. 4.

The timestamp 225 identifies a year, month, day and/or time that the exception occurred. In various embodiments, the timestamp 225 may reflect the last time that the exception was encountered, the first time the exception was encountered, or the timestamp 225 may include both the last and the first time the exception was encountered. In another embodiment, the timestamp 225 is not present or not used.

Figure 3:
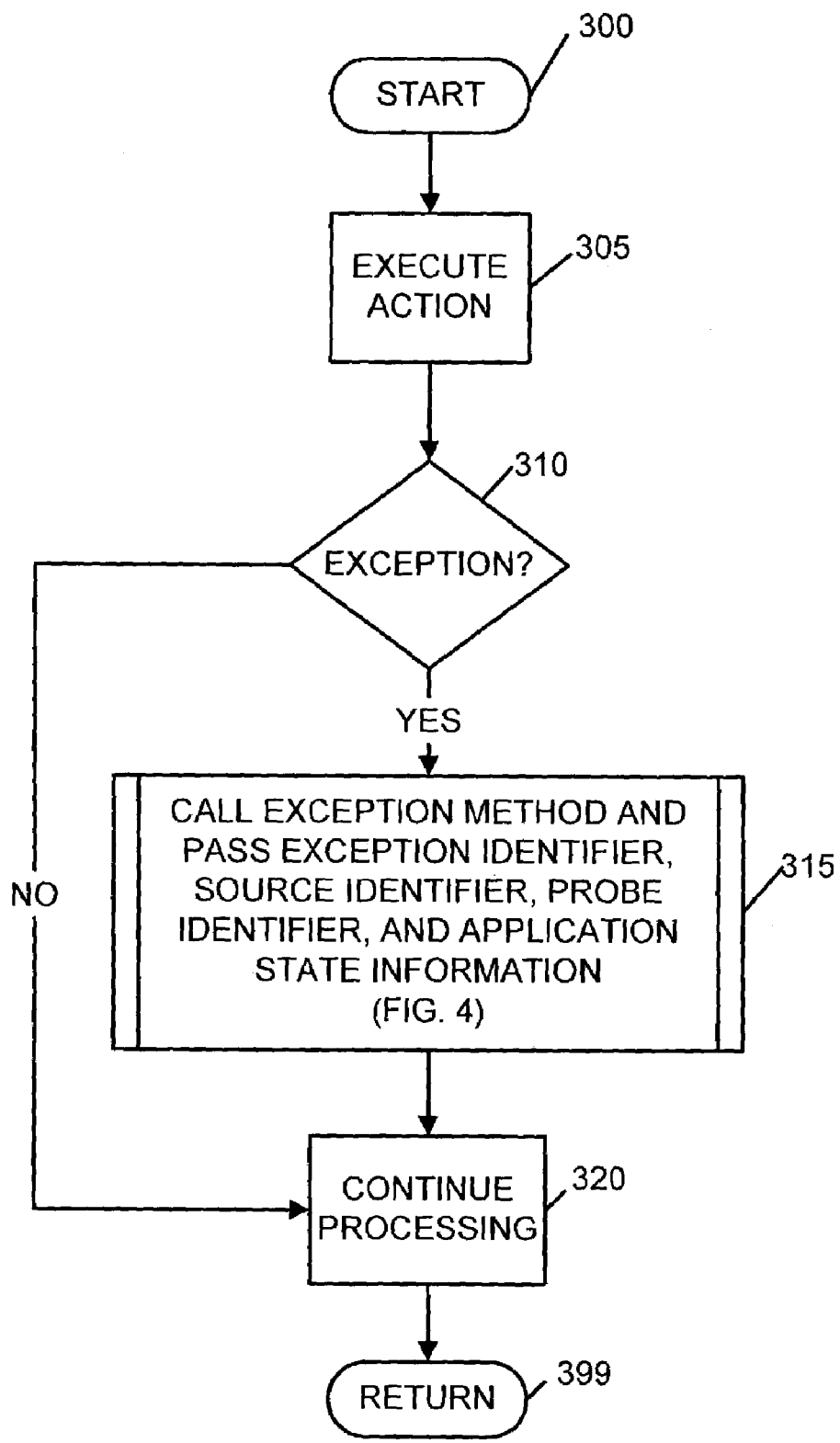
FIG. 3 depicts a flowchart of example processing for an application, according to an embodiment of the invention.

FIG. 3 depicts a flowchart of example processing for the application 126, according to an embodiment of the invention. Control begins at block 300. Control then continues to block 305 where the application 126 executes an action or operation that is capable of generating an exception. Control then continues to block 310 where the application 126 determines whether the action of block 305 has caused an exception condition. If the determination at block 310 is true, then control continues to block 315 where the application 126 calls the exception method 128 as further described below with reference to FIG. 4 and passes an exception identifier, a source identifier, a probe identifier, and optional application state information. Control then continues to block 320 where processing of the application 126 continues. Control then continues to block 399 where the function of the application 126 returns.

If the determination at block 310 is false, then control continues from block 310 directly to block 320, as previously described above.

The following pseudo-code is an example implementation of the logic of FIG. 3 for exception-based languages, such as Java and C++.

```
import com.acme.product.component;
public static void parseUserInput(String inputFileName) throws
operationFailed
    {
        FileInputStream fis = null;
        try {
            fis = new FileInputStream(inputFileName);
        }
        catch (FileNotFound fnf) { //File may not exist within the specified
filename
            ExceptionMethod(fnf, "com.acme.component.method", 1);
            try {
                fis = new FileInputStream("SomeDefaultValue");
            } catch (FileNotFound fnf2) { //The assumption is that this
will always work since it used default value
                ExceptionMethod(fnf2, "com.acme.component.method", 2);
            }
        catch(Throwable th) { // The open can also throw a
RuntimeException
            ExceptionMethod(th, "com.acme.component.method", 3);
            throw new operationFailed( );
        }
        finally {
        }
}
```

The following pseudo-code is an example implementation of the logic of FIG. 3 for exception-based languages, such as C, COBOL, Java, and C++.

```
import com.acme.product.component;
public static boolean conditionalProcessing(Parameters param) {
    if (param.validate( ) == false) {
        // The supplied parameters failed a validity check
        ExceptionMethod(null,
    "com.acme.product.component.conditionalProcessing", 1);
        return false;
    }
    ... // Normal processing
    return true;
}
```

Figure 4:
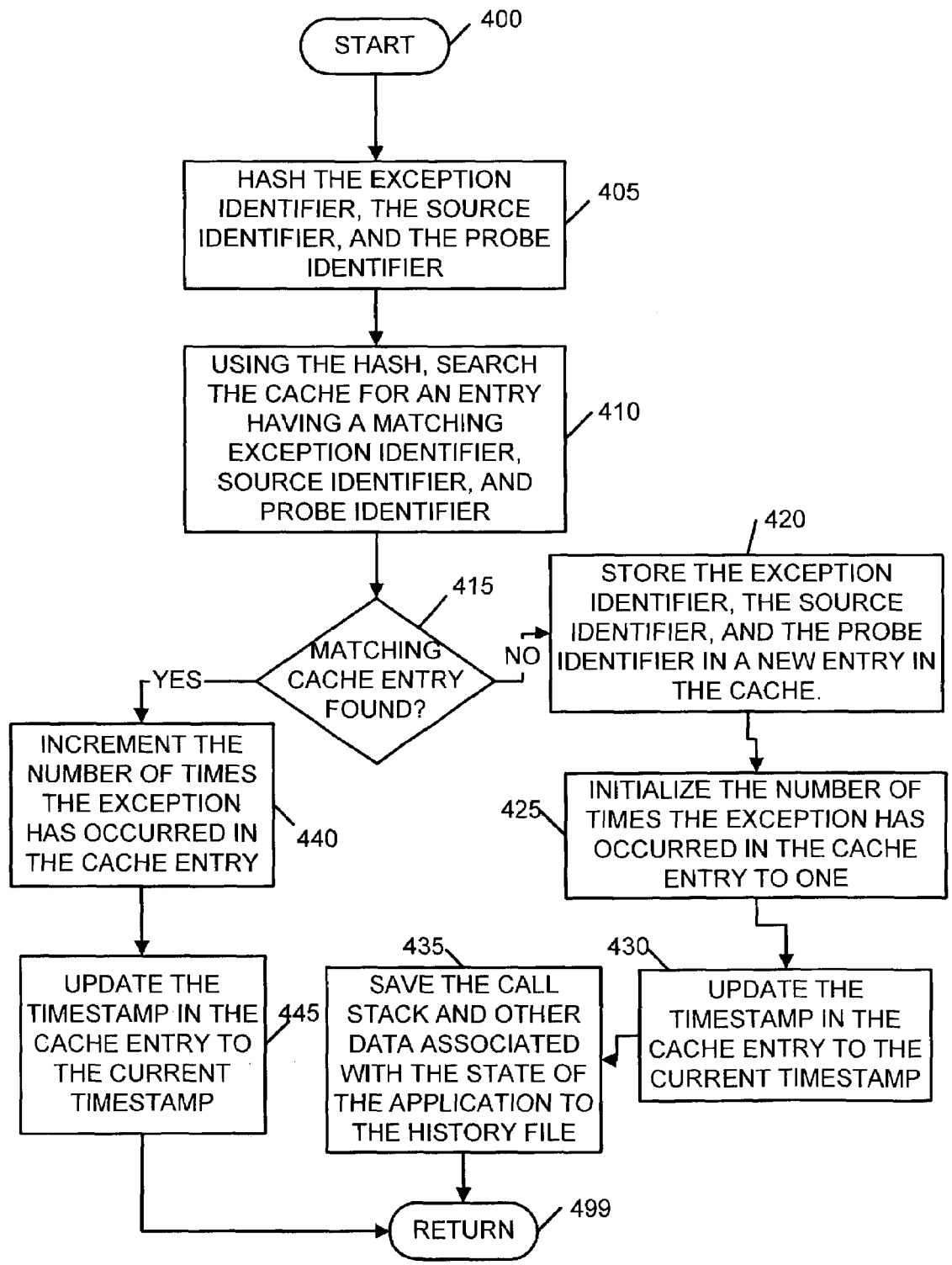
FIG. 4 depicts a flowchart of example processing for handling an exception, according to an embodiment of the invention.

FIG. 4 depicts a flowchart of example processing for handling an exception, according to an embodiment of the invention. Control begins at block 400. Control then continues to block 405 where the exception method 128 performs a hash function using the exception identifier, the source identifier, and the probe identifier, which in an embodiment are passed to the exception method 128 as parameters. In another embodiment, the exception identifier, the source identifier, and the probe identifier may be global variables or available to the exception method 128 via any other appropriate technique. Control then continues to block 410 where the exception method 128 uses the result of the hash function to search the cache 130 for a log entry having a matching exception identifier 205, source identifier 210, and probe identifier 215. In another embodiment, the exception method 128 may use any appropriate function to search the cache 130 for a matching log entry.

Control then continues to block 415 where the exception method 128 determines whether a matching log entry in the cache is found based on the hash function. If the determination at block 415 is true, then control continues to block 440 where the exception method 128 increments the exception count 220 in the found cache log entry. Control then continues to block 445 where the exception method 128 updates the timestamp 225 in the found cache entry to the current timestamp. In another embodiment, the exception method 128 no longer updates the timestamp 225 after the exception count has reached a selected number, which may be selected by the invoking application, determined as a default by the exception method 128, or determined by any other appropriate mechanism. In this way, the exception method 128 does not create a new log entry if one already exists for a matching exception, thus saving valuable time. Control then continues to block 499 where the function returns.

If the determination at block 415 is false, then control continues to block 420 where the exception method 128 creates a new log entry in the cache 130 and stores or logs the passed exception identifier, source identifier, and probe identifier into the fields 205, 210, and 215, respectively, into the new cache log entry. Control then continues to block 425 where the exception method 128 initializes the exception count 220 in the new log entry to one. Control then continues to block 430 where the exception method 128 updates the timestamp 225 in the new entry to the current timestamp. Control then continues to block 435 where the exception method 128 saves the call stack and other data associated with the state of the calling application 126 to the call stack history file 132. Control then continues to block 499 where the function returns.

In this way, an embodiment of the invention determines whether to log data about an exception based upon the exception and the current execution point in the call stack and logs only the first unique exception. In another embodiment, the exception method 128 may log a specified number of unique exceptions, where the number may be fixed or variable and may be specified by the invoking application 126, the exception method 128, or by any other appropriate mechanism.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of embodiments of the invention. But, the invention may be practiced without these specific details. In other instances, well-known circuits, structures, and techniques have not been shown in detail in order not to obscure the invention.

What is claimed is:

1. A method comprising:
    determining whether an exception has previously been logged based on an exception identifier, a source identifier, and a probe identifier, wherein the probe identifier identifies a location within executable instructions of a source that is identified by the source identifier, wherein the exception identified by the exception identifier occurred at the location, and wherein the probe identifier is identical for each time that the exception identified by the exception identifier occurs at the location and wherein the source identifier is different for each invocation of the source; and
    when the exception has not previously been logged, creating a new log entry and storing the exception identifier, the source identifier, and the probe identifier in the new log entry.

2. The method of claim 1, further comprising:
    when the exception has previously been logged in an existing log entry, incrementing an exception count in the existing log entry.

* * * * *